(12) United States Patent
Bedekar et al.

(10) Patent No.: US 11,711,859 B2
(45) Date of Patent: Jul. 25, 2023

(54) CONTROL OF MULTI-USER MULTIPLE INPUT MULTIPLE OUTPUT CONNECTIONS

(71) Applicant: NOKIA SOLUTIONS AND NETWORKS OY, Espoo (FI)

(72) Inventors: Anand Bedekar, Glenview, IL (US); Prasanna Mudlappa, Bangalore (IN); Parijat Bhattacharjee, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/883,952

(22) Filed: Aug. 9, 2022

(65) Prior Publication Data

US 2023/0051441 A1 Feb. 16, 2023

(30) Foreign Application Priority Data

Aug. 11, 2021 (FI) ..................................... 20215846

(51) Int. Cl.
*H04W 72/04* (2023.01)
*H04W 72/12* (2023.01)
(Continued)

(52) U.S. Cl.
CPC .......... *H04W 76/10* (2018.02); *H04B 7/0413* (2013.01); *H04W 72/541* (2023.01); *H04W 72/56* (2023.01)

(58) Field of Classification Search
CPC .... H04L 45/306; H04W 76/10; H04W 92/18; H04W 76/11; H04B 10/40; H04B 10/50; H04B 10/60
(Continued)

(56) References Cited

U.S. PATENT DOCUMENTS

2018/0160401 A1* 6/2018 Goto ..................... H04L 5/0053
2018/0242304 A1* 8/2018 Rong ..................... H04W 72/51
(Continued)

FOREIGN PATENT DOCUMENTS

WO 2019/185130 A1 10/2019
WO 2020/002127 A1 1/2020
(Continued)

OTHER PUBLICATIONS

Office Action dated Dec. 16, 2021 corresponding to Finnish Patent Application No. 20215846.
(Continued)

*Primary Examiner* — Khaled M Kassim
*Assistant Examiner* — Jason A Harley
(74) *Attorney, Agent, or Firm* — Squire Patton Boggs (US) LLP

(57) ABSTRACT

Apparatuses and methods in a communication system are provided. A method comprises receiving from network instructions of how to control multi-user multiple input multiple output connections maintained by one or more radio access nodes, the connections utilising one or more slices. One or more radio access nodes perform, based at least in part on the received network instructions, multi-user pairing of terminal devices of the same or different slices, and determine, based at least in part on the received network instructions, slice-based quota taking multi-user pairing and interference arising from paired allocations into account.

9 Claims, 7 Drawing Sheets

(51) Int. Cl.
  *H04W 76/10*  (2018.01)
  *H04W 88/10*  (2009.01)
  *H04W 76/11*  (2018.01)
  *H04W 28/26*  (2009.01)
  *H04W 72/56*  (2023.01)
  *H04W 72/541* (2023.01)
  *H04B 7/0413* (2017.01)

(58) Field of Classification Search
  USPC .................................................. 370/465
  See application file for complete search history.

(56) References Cited

U.S. PATENT DOCUMENTS

| | | | |
|---|---|---|---|
| 2020/0288384 A1* | 9/2020 | Li | H04W 24/02 |
| 2020/0367072 A1 | 11/2020 | Lin | |
| 2020/0367109 A1* | 11/2020 | Chen | H04W 28/18 |

FOREIGN PATENT DOCUMENTS

| | | |
|---|---|---|
| WO | 2020/212640 A1 | 10/2020 |
| WO | 2021/130615 A1 | 7/2021 |

OTHER PUBLICATIONS

Finnish Search Report dated Dec. 16, 2021 corresponding to Finnish Patent Application No. 20215846.

Communication of Acceptance—section 29 a of Patents Decree dated Apr. 14, 2022 corresponding to Finnish Patent Application No. 20215846.

Petar Popovski et al., "5G Wireless Network Slicing for eMBB, URLLC, and mMTC: A Communication—Theoretic View," in: IEEE Access IEEE, vol. 6, pp. 55765-55779, Sep. 28, 2018.

Notice of Preliminary Rejection dated Sep. 18, 2022 corresponding to Korean Patent Application No. 2022-0100347, with English Summary thereof.

Extended European Search Report issued in corresponding European Patent Application No. 22186406.9, dated Dec. 16, 2022.

"3GPP Technical Specification Group Services and Systems Aspects; Management and orchestration; Self-Organizing Networks (SON) for 5G networks (Release 17)", 3GPP TS 28.313, No. V17.1.0., Jun. 24, 2021, pp. 1-50.

"3GPP Technical Specification Group Services and System Aspects; Management and orchestration; 5G Network Resource Model (NRM); Stage 2 and stage 3 (Release 17)", 3GPP TS 28.541, No. V17.2.0, Mar. 31, 2021, pp. 1-425.

"3GPP Technical Specification Group Services and System Aspects; Management and orchestration; 5G performance measurements (Release 16)", 3GPP TS 28.552, vol. SA WG5, No. V16.1.0, Mar. 28, 2019, pp. 1-87.

"3GPP Technical Specification Group Services and System Aspects; Management and orchestration; Study on enhancement of Management Data Analytics (MDA) (Release 17)", SP-210139, 3GPP TR 28.809, No. V2.0.0, Mar. 17, 2021, pp. 1-99.

\* cited by examiner

CONTROL OF MULTI-USER MULTIPLE INPUT MULTIPLE OUTPUT CONNECTIONS

FIELD

The exemplary and non-limiting embodiments of the invention relate generally to wireless communication systems. The exemplary and non-limiting embodiments of the invention relate especially to apparatuses and methods in wireless communication networks.

BACKGROUND

In wireless telecommunication systems there is a constant need for higher data rates and high quality of service. Reliability requirements are constantly rising and ways and means to ensure reliable connections and data traffic while keeping transmission delays minimal are constantly under development.

Developing networks enable new services to customers. One suggested service is network slicing, which enables offering connectivity, quality of service and data processing solutions tailored to specific customers' requirements. A network slice is a logical end-to-end virtual network that can be dynamically created and that provides specific capabilities and characteristics. Multiple network slices may be created on top of a common shared physical network infrastructure to run services that may have different requirements on latency, reliability, throughput, and mobility.

Another proposed technology is Multi-User Multiple Input Multiple Output, MU-MIMO, technology. In MU-MIMO spatially distributed users may share the same network resources simultaneously.

Combination of radio access network slices and MU-MIMO presents some challenges related to resources used and how users may be paired.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus recited in one or more claims.

According to an aspect of the present invention, there is provided a method recited in one or more claims.

According to an aspect of the present invention, there is provided a computer program recited in one or more claims.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIG. 1 illustrates an example of a simplified system architecture of a communication system;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a communication device, a network element of a communication system, a distributed realisation of a network element, a base station, eNodeB, gNodeB, a distributed realisation of a base station, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
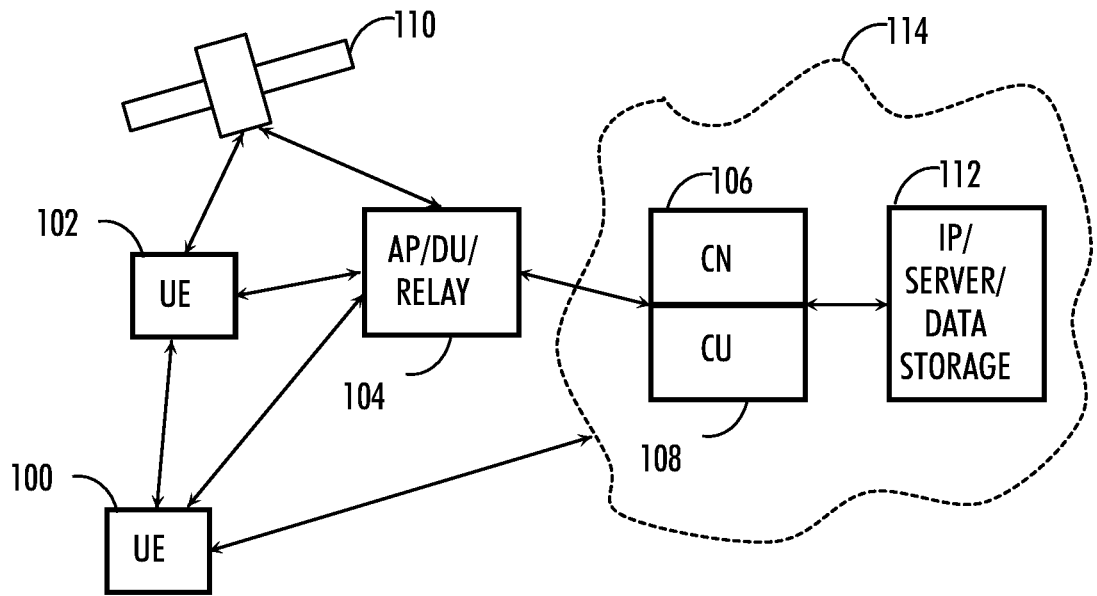

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio frequencies, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). A satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). An HNB Gateway (HNB-GW), which is typically installed within an operator's network may aggregate traffic from a large number of HNBs back to a core network.

As mentioned, network slicing is a concept where network resources of an end-to-end connection between a user terminal and another end point in a public land mobile network (PLMN) are sliced. Similar network slicing may be employed also in private networks. A network slice may be understood as a logical end-to-end network that can be dynamically created and/or modified. The network(s) between the end devices may all be sliced from one end device to the other end device, the slices thus forming logical pipelines within the network(s). User terminal may access a slice over a radio interface. A pipeline/slice may serve a particular service type. So far, three different network slice/service types have been standardized: eMBB (slice suitable for the handling of 5G enhanced Mobile Broadband), URLLC (slice suitable for the handling of ultra-reliable low latency communications) and MIoT (slice suitable for the handling of massive Internet of Things). Communications Service Providers (CSPs) are able to define additional network slice/service types if needed. A given user terminal may access to multiple slices over the same Access Network (over the same radio interface, for example).

Thus, network slicing enables a communications service provider to provide dedicated virtual networks over a common network infrastructure. The different virtual or logical networks may be designed to provide different networking characteristics such as different qualities of service, QoS, in order to host services with diverse requirements and service level agreements, SLAs. For example, the virtual networks may be customized to meet specific needs of various applications, services, devices, customers and/or operators.

As mentioned, MU-MIMO technology allows spatially distributed users to share the same network resources, simultaneously, using MU pairing. In MU-MIMO, radio access node may transmit multiple data streams, one for each terminal device, using the same time-frequency resources.

MU-MIMO and slicing may be used simultaneously. The radio access node may utilise more than one slices, where each slice serves a number of terminal devices. Resource quotas per-slice can be defined in terms of Physical Resource Block, PRBs. When MU-MIMO is used, the same PRB resource can be assigned or reused to multiple terminal devices. The terminal devices may belong to the same slice or to different slices. Using slicing and MU-MIMO together provides many advantages but also some challenges. An advantage is an increase the total cell throughput, i.e. cell capacity.

Resource quotas for different slices may be defined in terms of Physical Resource Blocks, PRBs. In MU-MIMO, multiple terminal devices may transmit using the same PRB at the same time. As the PRBs may be allocated to terminal devices of the same slice or devices of different slices, this makes it difficult to determine whether a given PRB affects quota of a given slice.

The multiple terminal devices utilising a given PRB in a slot use different beams transmitted by the radio access node. However, typically beams are not completely orthogonal, and thus some interference may be present. The interference from other terminal devices utilising the same resources may vary slot by slot and cause uncertainty in the Quality of Service, QoS, experienced by the terminal devices.

Further, as terminal devices of different slices may be allocated the same resources, and this may vary slot by slot. This variability may cause uncertainly in the performance of a slice.

An embodiment provides an apparatus configured to perform preferential MU-pairing and provider solution to efficient usage of resources based on the network conditions at any point in time.

Figure 2A:
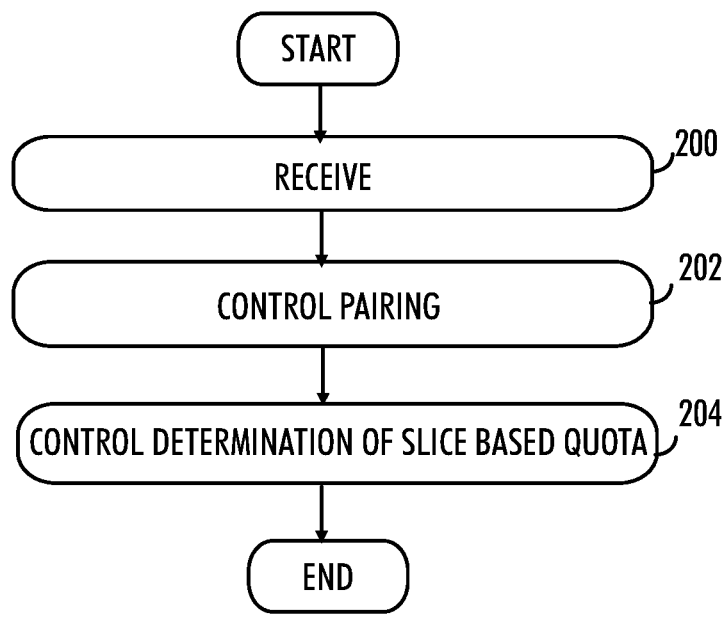
FIGS. 2A, 2B and 3 are flowcharts illustrating embodiments of the invention.

The flowchart of FIG. 2A illustrates an embodiment. The flowchart illustrates an example of the operation of a network apparatus or entity. The network apparatus or entity may comprise one or more network elements and it may be denoted as MU-aware Slice Policy Controller or MUSPC. In an embodiment, the MUSPC may be located at RAN Intelligent Controller, RIC, or Operations, Administration and Maintenance, OAM, of the communication network. In an embodiment, the MUSPC may be located at e RAN node, gNB.

In step 200, the apparatus is configured to receive from network instructions of how to control multi-user multiple input multiple output connections maintained by one or more radio access nodes, the connections utilising one or more slices.

In step 202, the apparatus is configured to control one or more radio access nodes to perform, based at least in part on the received network instructions, multi-user pairing of terminal devices of the same or different slices.

In step 204, the apparatus is configured to control one or more radio access nodes determine, based at least in part on the received network instructions, slice-based quota taking multi-user pairing and interference arising from paired allocations into account.

Figure 2B:
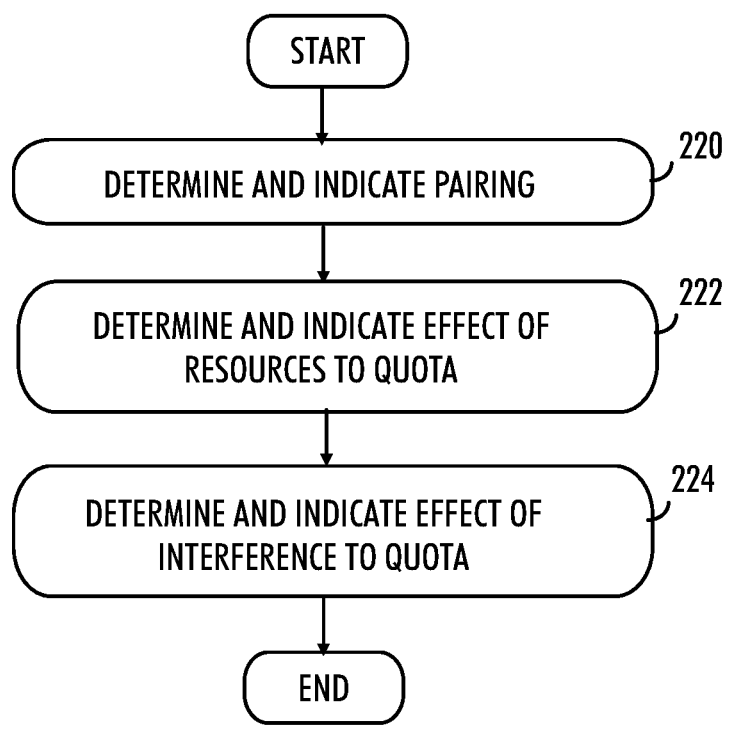

The flowchart of FIG. 2B illustrates an embodiment. The flowchart illustrates an example of the operation of the MU-aware Slice Policy Controller or MUSPC in some more detail.

In step 220, the apparatus is configured to determine and indicate, based on the received instructions, to one or more radio access nodes a relative preference for preferring or avoiding multi-user multiple input multiple output pairing users of a given slice with users of the same slice, or users of a different slice. The relative preference of multi-user pairing terminal devices of a given slice with terminal devices of the same slice or terminal device of different slices may be determined and indicated.

In step 222, the apparatus is configured to determine and indicate, based on the received instructions, to one or more radio access nodes a relative preference on how to perform counting of resources consumed by a slice compared to its slice quota when resources have been allocated in multi-user multiple input multiple output pairing fashion to multiple users of one or more slices in a slot. The relative preference of how multi-user resources of multiple input multiple output pairing are to be taken into account in determining slice-based quota may be determined and indicated.

In step 224, the apparatus is configured to determine and indicate, based on the received instructions, to one or more radio access nodes a relative preference on how to adjust the resources consumed by various slices taking into account the effect of interference between users belonging to the same slice or different slices that have been given multi-user multiple input multiple output paired allocations. The relative preference of whether interference arising from multi-user multiple input multiple output paired allocations are taken into account in determining slice-based quota may be determined and indicated.

Figure 3:
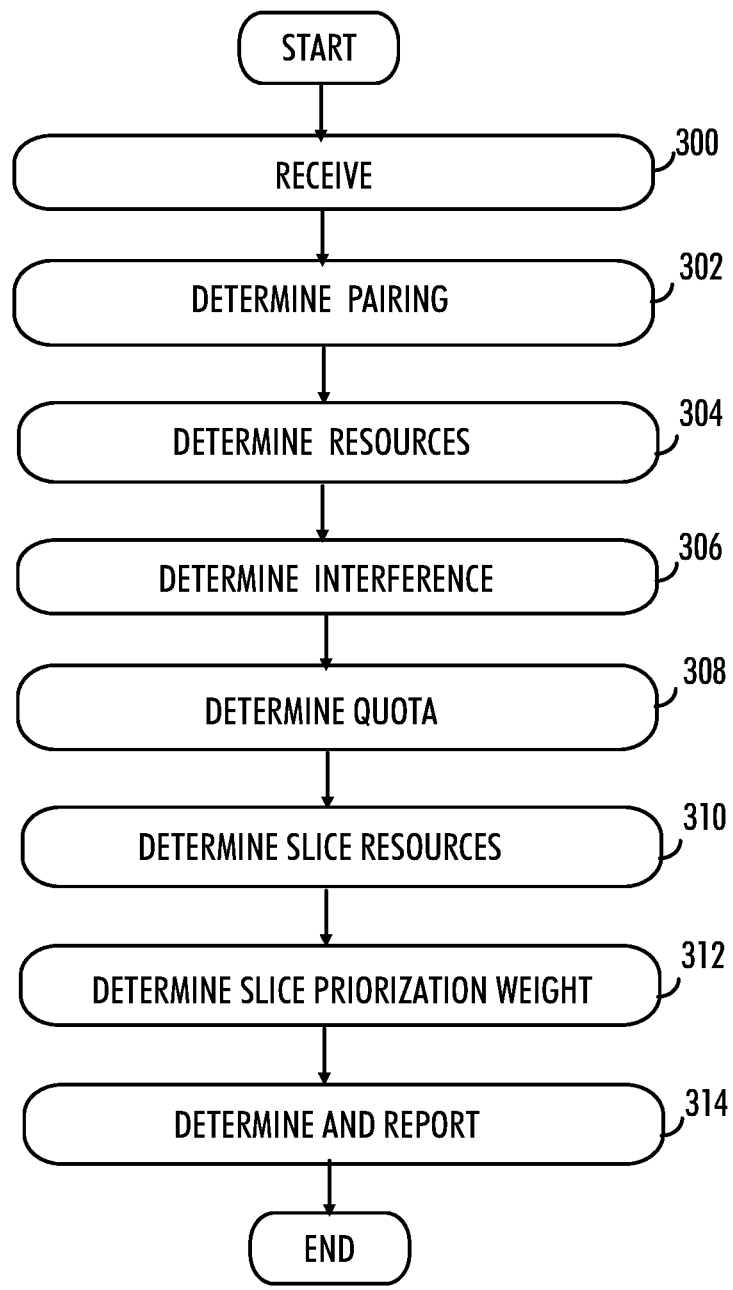

The flowchart of FIG. 3 illustrates an embodiment. The flowchart illustrates an example of the operation of a network apparatus or entity. The network apparatus or entity may comprise one or more network elements. In an embodiment, the apparatus is a radio access node, such as gNB or a part of an gNB.

In step 300, the apparatus is configured to receive, from a network apparatus, instructions of how to control multi-user multiple input multiple output connections maintained by the apparatus, the connections utilising one or more slices.

In step 302, the apparatus is configured to determine, based on the received instructions, a first adjustment factor indicating how to perform multi-user pairing for terminal devices from a same of different slice.

In step 304, the apparatus is configured to determine, based on the first adjustment factor and a slice prioritization weight, multi-user pairing and resource allocation for terminal devices.

In step 306, the apparatus is configured to determine, based on the received instructions, a second adjustment factor to resources counted as consumed by a slice, the factor indicating how to take interference between terminal devices into account.

In step 308, the apparatus is configured to determine, based on the received instructions and the second adjustment factor, a third adjustment factor indicating how to count resources towards slice quota.

In step 310, the apparatus is configured to determine the number of resources consumed by a slice based on the number of allocated resources and second and third adjustment factors.

In step 312, the apparatus is configured to determine, based on the determined number of resources, slice prioritization weight to be used in subsequent pairing and resource determination.

In step 314, the apparatus is configured to determine and transmit a report to network regarding pairing, resources and interference.

Figure 4A:
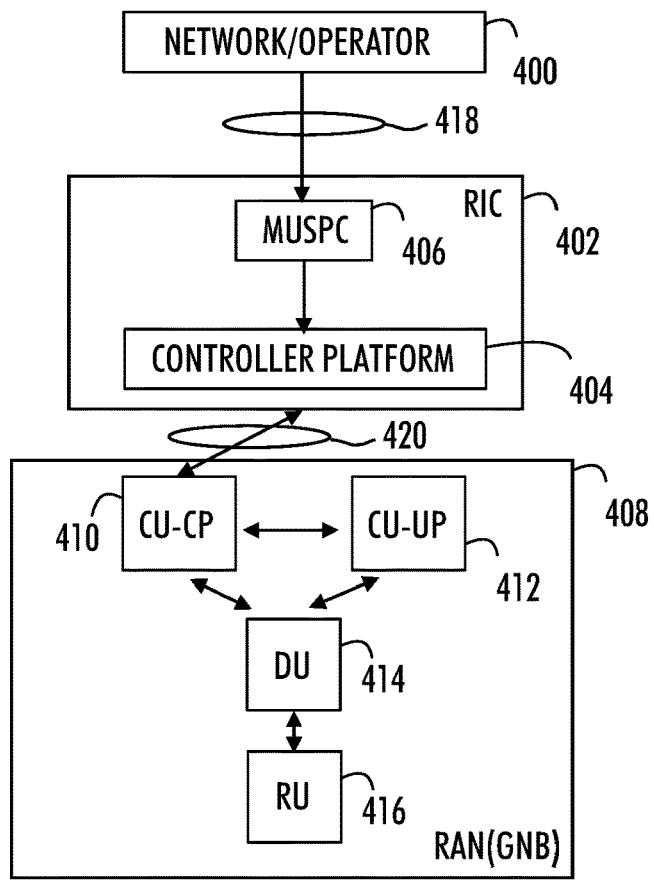
FIGS. 4A and 4B illustrate examples of some embodiments.

FIG. 4A illustrates an example overview of a communication system where the MUSPC apparatus of FIG. 2 is located at RAN Intelligent Controller, RIC.

The system comprises a network element 400 such as an Operator Network Management System, ONAP, or a tenant portal.

The network element 400 communicates with a RAN Intelligent Controller, RIC, 402 or Operations, Administration and Maintenance, OAM, of the communication network.

In an embodiment, RIC 402 provides an open platform architecture based on open application programming interfaces, APIs, that allows RAN optimization algorithms to be hosted on it. In RIC, radio resource management or optimization algorithms may be realised as services on top of an underlying controller platform 404. The controller platform can provide the ability to interface with radio access network for receiving information from the radio access network as well as communicating information or control actions to the radio access network.

In an embodiment, the RIC or OAM 402 comprises MU-aware Slice Policy Controller or MUSPC 406. The MUSPC 406 may be a service or a module that is instantiated on the controller platform 404 as part of the RIC, for example. MUSPC 406 can communicate with gNBs 408 of the network via E2 interface 420. MUSPC 406 may also have a northbound interface that can be supported over the A1 northbound interface 418 of the RIC towards a northbound system such as ONAP or RIC-non-real-time or Operator network management system or Tenant Portal 400.

In an embodiment, the gNB 408 comprises a Control Unit 410 for Control Plane, CU-CP, and a Control Unit 412 for User Plane, CU-UP. The gNB 410 may further comprise a distributed unit, DU, 414 and a remote unit, RU, 416.

Figure 4B:
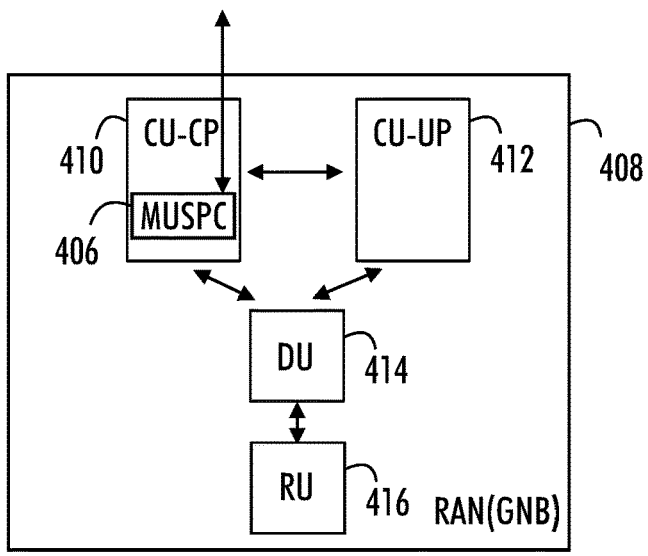

FIG. 4B illustrates an example overview of a communication system where the MUSPC apparatus of FIG. 2 is located at the Control Unit 410 for Control Plane, CU-CP of gNB 402, in either a cloud RAN architecture or a classical gNB architecture.

In an embodiment, MUSPC is configured to receive policy instructions from the network.

MUSPC determines a command to send to gNB (based on policy instructions from northbound API) containing policy descriptors for one or more slice for one or more of the following preference indicators and sends the command to the gNb.

In an embodiment, MUSPC receives from the network 400, such as an Operator Network Management System, ONAP, or a tenant portal, policy instructions regarding multi-user multiple input multiple output paired allocations.

In an embodiment, the MUSPC receives a preference for MU-pairing users of a given slice with users of the same slice, or users of a different slices.

In an embodiment, MUSPC is configured to, based on the instructions, determine and transmit to one or more RAN nodes a first preference indicator. The first preference indicator indicates a relative preference for preferring (or avoiding) MU-MIMO-pairing users of a given slice with users of the same slice, or users of a different slices.

In an embodiment, the first preference indicator may have a numerical value between a first value indicating that a radio access node should avoid Mu-pairing users of the same slice and a second value indicating that a radio access node should only pair users of the same slice.

For example, the numerical value may be between 0 and 1, where
  0 indicates that gNB should avoid Mu-pairing users of the same slice (pairing is allowed only for users of different slices),
  1 indicates that gNB should only pair users of the same slice (pairing of users of different slices is prevented),
  values between 0 and 1 indicate a gradual preference for pairing users of the same slice or pairing users of different slices.

Alternatively, the numerical value may obtain values {High, Medium, Low} where
  High indicates gNB should avoid Mu-pairing users of the same slice (only allow pairing users of different slices)
  Low indicates gNB should only pair users of the same slice (prevent pairing users of different slices), and
  Medium indicates no strong preference either towards users of the same slice or users of different slices.

In an embodiment, the MUSPC receives a preference of how MU-MIMO-pairing-allocated resources should count towards slice quota.

In an embodiment, MUSPC is configured to, based on the instructions, determine and transmit to one or more RAN nodes a second preference indicator. The second preference indicator indicates a manner of counting resources consumed by a slice compared to its slice quota when resources have been allocated in MU-MIMO-pairing fashion to multiple users of one or more slices in a slot.

In an embodiment, if it is determined that a given number N terminal devices of a slice are allocated the same set P of resource blocks, PRBs, in a given slot, where N is greater than one, the second preference indicator may take three values {A, B, C}, where: if N>1 users of the same slice are allocated the same set of P PRBs,
  first value A indicates that each of the users should be treated as having consumed all of the resources. Thus, the slice should be treated as having consumed N*P PRBs in that slot, for the purposes of comparing with its quota,
  second value B indicates that slice should be treated as having consumed only P PRBs, regardless of N, and
  third value C indicates that if the number of terminal devices N is greater or equal to two, the slice should be treated as having consumed P*2 PRBs, otherwise, P PRBs.

In an embodiment, the MUSPC receives a preference of whether slices should be given credit towards quota based on interference arising from MU-MIMO-paired allocations.

In an embodiment, MUSPC is configured to, based on the instructions, determine and transmit to one or more RAN nodes a third preference indicator. The third preference indicator indicates a manner of adjusting the resources consumed by various slices taking into account the effect of interference between users (belonging to the same slice or different slices) that have been given MU-MIMO-paired allocations.

In an embodiment, the first preference indicator may have three values {X, Y, Z}. Assume here that P resource blocks, PRBs, have been allocated.

The first value X indicates that effect of interference between terminal devices is ignored, and any individual terminal device is treated as having consumed all allocated P resource blocks. Further, the second preference Indicator may be applied for determining the resource consumption of the slice.

The second value Y indicates that if a given terminal device gets a paired allocation on a certain number of resources, then the terminal device is treated as having consumed a reduced number of resources based on the reduction in spectral efficiency that the terminal device would experience due to interference. Further, the second preference Indicator may be applied for determining the resource consumption of the slice.

The third value Z indicates that the rule of first value X is applied if all users are of the same slice, whereas the rule of second value Y is applied if the users are of different slices.

In an embodiment, the above first, second and third preference indicators may be communicated on a per-slice basis, or as a common value applicable to more than slices.

Figure 5:
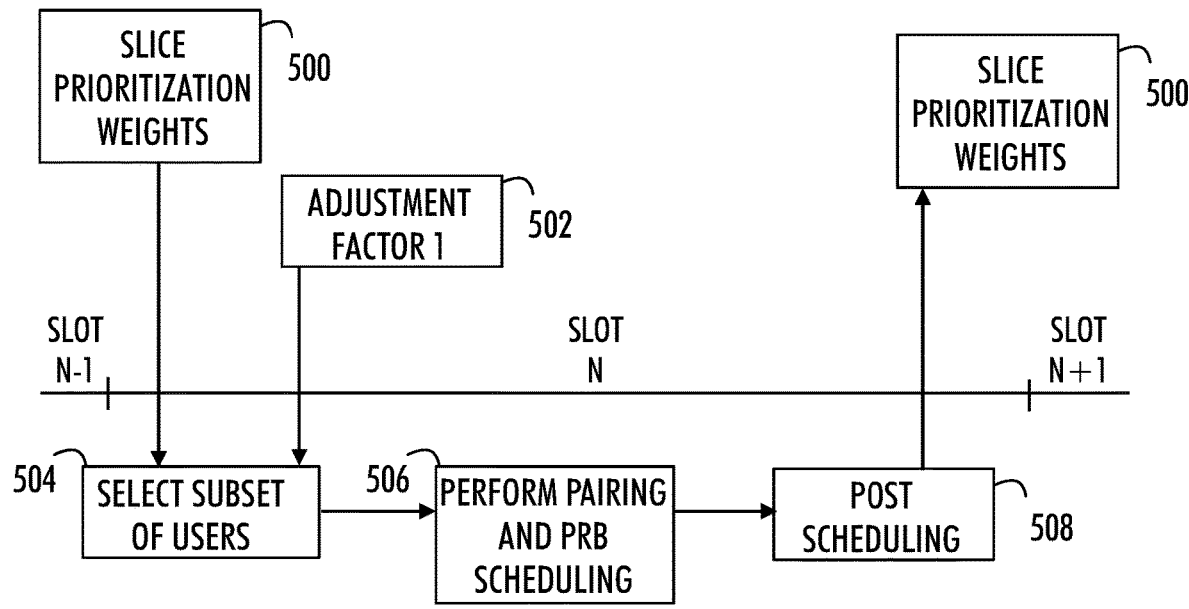
FIG. 5 illustrates an example of slot-wise operation in some embodiments.

In gNBs, a layer 2 packet scheduler, L2-PS, is responsible for scheduling users to transmit/receive data. A per-slot operation of the L2-PS may be described as 1) Select subset of eligible users for various slices
2) Perform MU-pairing decision and PRB allocation
3) Update Slice resource consumption A slot-wise operation of gNB L2-PS is illustrated in FIG. 5.

In step 500, the gNB L2-PS is configured to determined adjusted prioritization weights (described below), based on adjusted per-slice resource consumption relative to slice-quota.

First adjustment factor is determined in step 502. The first adjustment factor indicates to prefer or avoid MU-pairing of users based on the first preference Indicator, as in following:

a) prefer or avoid pairing users from the same slice
b) prefer or avoid pairing users from different slices
c) a combination of above choices.

The adjusted prioritization weight and the first adjustment factor is used in steps 504 and 506 in determining the pairing of users and resource allocation for MU-MIMO transmission.

Consider an example: Assume that the first preference indicator has a numeric value between 0 and 1:

If the first preference indicator is 0: During MU-pairing, when considering whether to pair a given user with a currently selected set of users, if the current set of so-far-selected users includes any users of the same slice as the user under consideration, then the first adjustment factor value is set to 0, otherwise the first adjustment factor value is set to 1.

If the first preference indicator is 1: During MU-pairing, when considering whether to pair a given user with a currently selected set of users, if the current set of so-far-selected users includes any users of a different slice from the user under consideration, then first adjustment factor value is set to 0, otherwise the first adjustment factor value is set to 1.

If first preference indicator is a value between 0 and 1: During MU-pairing, when considering whether to pair a given user with a currently selected set of users, the first adjustment factor is set to a value of (first preference indicator)*($N_{other}$)/(N), where $N_{other}$=number of users in the so-far-selected users set belonging to a different slice than the user under consideration, and N equals to total number of users in the so-far-selected users set.

During MU-pairing, once the first adjustment factor is determined, the slice prioritization weight of the user is then multiplied by the first adjustment factor, and MU-pairing algorithm proceeds considering this modified weight.

The gNB L2-PS is configured to determine a second adjustment factor, based on third preference indicator, which indicates the manner of taking into account the effect of interference between users (belonging to the same slice or different slices) are given MU-MIMO-paired allocations. Typically, this second adjustment factor is set per user.

Consider an example. Assume the third preference indicator takes a value from {X,Y,Z}:

If third preference indicator=X, the effect of interference is ignored.

If third preference indicator=Y, the effect of reduced spectral efficiency experienced by an MU-Paired user due to MU-MIMO interference can be determined as follows:

As an alternative, if a user k is getting an MU-MIMO paired allocation of P PRBs obtains an effective MU-MIMO spectral efficiency $E_k$ on the P PRBs of the MU-MIMO allocation, but would have obtained a spectral efficiency of $F_k$ if it was not MU-paired with other users, then set second adjustment factor equal to ($E_k/F_k$). Typically, $E_k<F_k$, due to the increased interference from MU-MIMO pairing, that is,
an MU-MIMO paired user would suffer some loss in spectral efficiency relative to an SU-MIMO transmission to that user without MU-MIMO. So ($E_k/F_k$) is a measure of the reduction in spectral efficiency for that user due to MU-MIMO interference, and effectively, the resources consumed by the user should be reduced by this factor.

As another alternative, if a user k is getting allocated $M_k$ bits (e.g. transport block size of $B_k$) on the P PRBs due to MU-MIMO, but would have been allocated $S_k$ bits on the same PRBs if the same PRBs had been given only to that user (i.e. SU-MIMO allocation), then the second adjustment factor is set to $M_k/S_k$.

If third preference indicator=Z, then Z indicates that the rules of indicator value X should be applied if all users are of the same slice, whereas the rules of indicator value Y should be applied if the users are of different slices.

The gNB L2-PS is configured to determine a third adjustment factor, based on second preference indicator, which indicates the manner of counting resources towards slice quota when resources have been allocated in MU-MIMO-pairing fashion to multiple users of a slice. Typically, this adjustment factor is set per slice.

As an example, the second preference indicator may take values {A, B, C}. Assuming more than one N users of a given slice are allocated the same set of P PRBs by MU-MIMO in a given slot:

If the second preference indicator=A, the third adjustment factor for the slice is set to N.

If the second preference indicator=B, third adjustment factor for the slice is set to 1.

If the second preference indicator=C, third adjustment factor for the slice is set to min(2,N).

Further, the gNB L2-PS may be configured to, using the second and third adjustment factors, to determine an adjusted resource consumption of a slice, and further using the adjusted resource consumption of the slice to determine an adjusted slice prioritization weight to be used in subsequent MU-pairing and resource allocation.

For example, determine adjusted slice prioritization weight W for a slice to be used in subsequent pairing and resource allocation as $$\text{weight } W = P * \text{third adjustment factor} \quad \text{(Eq. 1)}$$
$$(\text{slice}) * \frac{1}{K}\sum\nolimits_{k=1,\ldots K}(\text{second adjustment factor}(i)),$$

where K is the number of terminal devices in a slice and P is the number of allocated resource blocks.

Returning to FIG. 5, in post scheduling 508, adjusted per-slice resource consumption is determined taking into account the loss in spectral efficiency (second adjustment factor, based on the third preference indicator) and whether MU-MINO users were from the same of different slices (third adjustment factor, based on second preference indicator).

Figure 6:
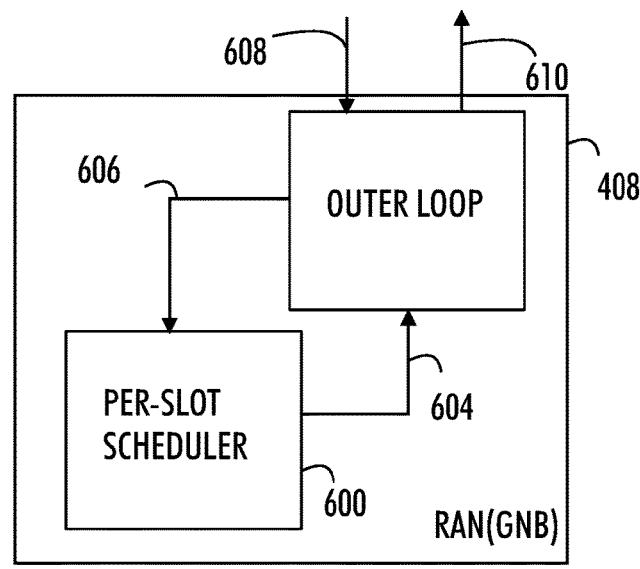
FIG. 6 illustrates an example of operation of an gNB in some embodiments.

FIG. 6 illustrates as embodiment. The gNB may comprise an inner loop 600 and an outer loop 602. In each slot in the inner sloop 600, gNB L2-PS scheduler performs MU-pairing decisions and resource allocation and determines the (adjusted) amount of resources consumed by each slice.

The outer loop 602 carries out slice prioritization weight update on a slower time scale. The time scale may be, for example, of the order of 100 slots. This interval may be referred to as 'control period', where slice priority weights are determined based on comparing (adjusted) slice consumption to quota. The per-slice PRB usage from the inner loop above is fed 604 to outer loop. After every 'control period' determination of slice prioritization weight over the next 'control period' is sent 606 to inner loop.

Outer loop receives preference indicators 608 and reports 610 metrics to MUSPC.

In an embodiment, the adjusted slice prioritization weight may be calculated as follows: If the adjusted resources consumed by a slice in slot t are R(t), where adjusted resource consumption is determined using second and third adjustment factors, a time-average $A_{avg}(t)$ of R(t) over a suitable time scale (such as sliding window average or exponential moving average, for example) may be calculated. If $A_{min}$ is the minimum guaranteed resource quota and $A_{max}$ is the maximum allowed resource quota, the adjusted slice prioritization weight w of the slice may be calculated as:

$$w = W^* \max(A_{max} - A_{avg}, 0)/(A_{max} - A_{min}), \text{ if } A_{avg} \geq A_{min},$$

$$w = W \text{ otherwise.} \quad (Eq.2)$$

where W is from Eq.1.

This adjusted slice prioritization weight may be then used in subsequent resource allocation and MU-pairing decisions, together with the first adjustment factor 1 as described above.

In an embodiment, the metrics 610 reported to MUSPC may comprise following:

Frequency with which terminal devices of a given slice arer paired with terminal devices of the same slice or other terminal devices of other slices.

Amount of interference between terminal devices of a given slice and between terminal devices of a given slice with terminal devices of other slices.

Amount by which quota of a slice was adjusted due to interference from MU-paired allocations.

Amount by which consumed resources of a slice were adjusted due to MU-paired allocations.

Figure 7:
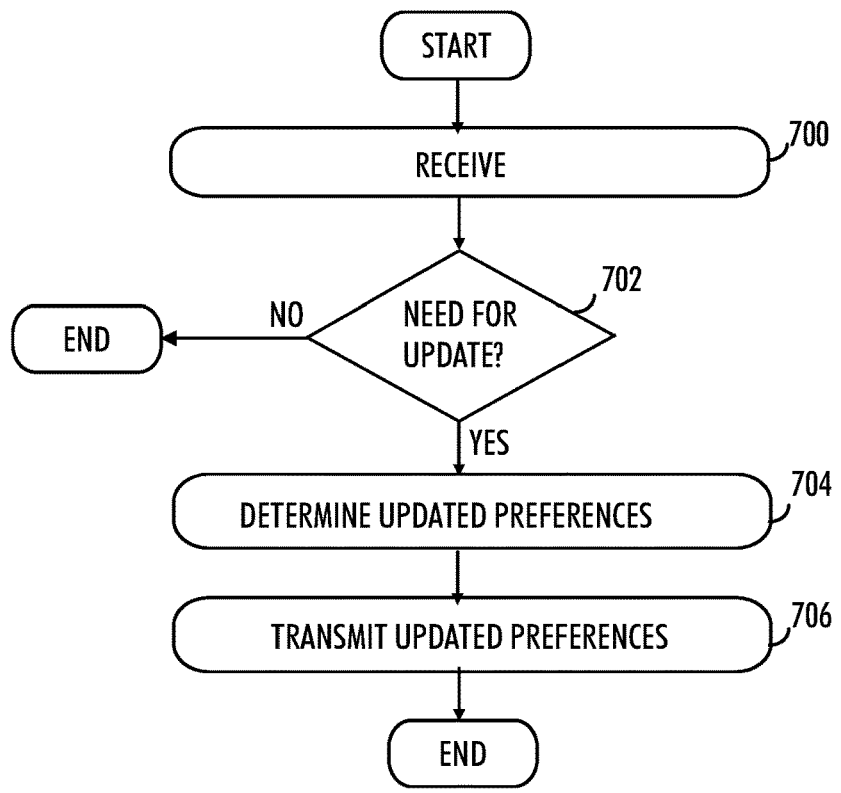
FIG. 7 is a flowchart illustrating an embodiment.

In an embodiment, the MUSPC may adjust and communicate first, second and third preference indicators back to gNB. FIG. 7 illustrates this embodiment.

In step 700, the MUSPC apparatus is configured to receive metrics from gNB.

In step 702, the MUSPC apparatus is configured to determine, based on the received metrics, if the preference indicators need updating. Each indictor may be determined separately. If not, the process ends.

In step 704, the MUSPC apparatus is configured to determine, based on the received metrics, update the preference indicators.

In step 706, the MUSPC apparatus is configured to send updated preference indicators to gNB.

As mentioned, the MUSPC may communicate with a network element 400 such as an Operator Network Management System, ONAP, or a tenant portal. The network element provides the possibility to manage network and services. Is also responsible for taking decisions regarding change of preferences and/or service level agreements, SLAs, for tenants.

In an embodiment, the network element may perform analysis on how well the slice quotas are working with the current MU-pairing preferences and other overall key parameters. Based on the analysis and the dynamics of constantly changing terminal device interaction with cells (under the given circumstances), it may decide to modify the preferences/SLAs.

In an embodiment, the network element may receive updates on the current performance of slices in relation to slice quotas, requests to change preferences if necessary and overall performance of cell (KPIs) under the given SLAs and preferences.

In an embodiment, the network element may send policy instructions of operator and/or tenant preferences, such as preference for MU-pairing users of a given slice with users of the same slice, or users of a different slices, preference of how MU-MIMO-pairing-allocated resources should count towards slice quota and preference of whether slices should be given credit towards quota based on interference arising from MU-MIMO-paired allocations.

The proposed solution reduces uncertainty in the presence of MU-MIMO and ensures more predictable slice performance and quality of service, ensures fulfilment of SLAs, avoids penalties for operators, and provides greater satisfaction for tenants.

Figure 8:
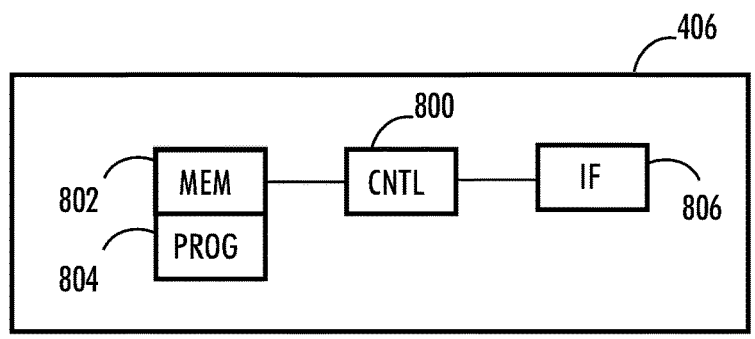
FIGS. 8, 9A and 9B illustrate simplified examples of apparatuses applying some embodiments of the invention.

FIG. 8 illustrates an embodiment. The figure illustrates a simplified example of an apparatus or network element applying embodiments of the invention. In some embodiments, the apparatus may be a network element or a part of a network element. In some embodiments, the apparatus may comprise several network entities connected to each other. In an embodiment, the apparatus is a MU-aware Slice Policy Controller or MUSPC 406.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 406 of the example includes a control circuitry 800 configured to control at least part of the operation of the apparatus.

The apparatus may comprise a memory 802 for storing data. Furthermore, the memory may store software 804 executable by the control circuitry 800. The memory may be integrated in the control circuitry.

The apparatus further comprises one or more interface circuitries 806 configured to connect the apparatus to other devices and network elements of the radio access network. The interface may provide a wired or wireless connection.

In an embodiment, the software 804 may comprise a computer program comprising program code means adapted to cause the control circuitry 800 of the apparatus to realise at least some of the embodiments described above.

Figure 9A:
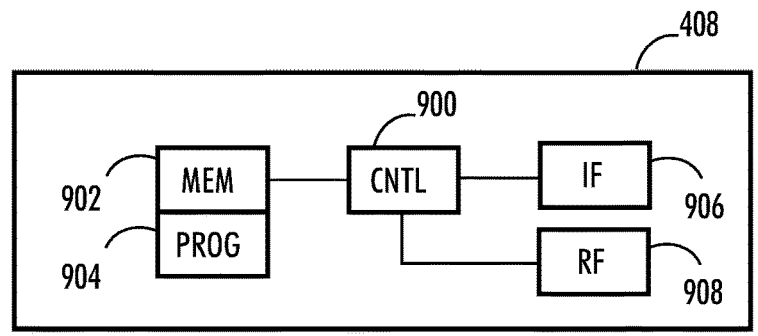
Figure 9B:
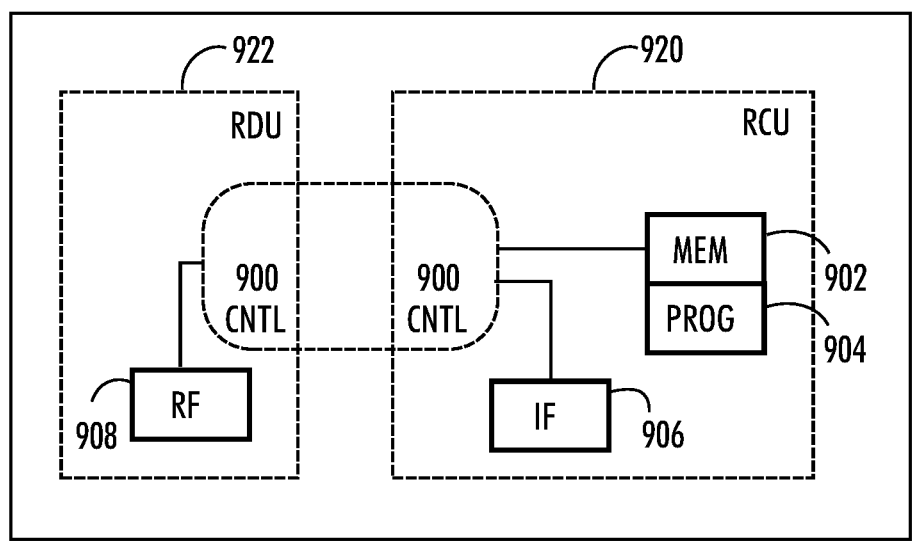

FIGS. 9A and 9B illustrates an embodiment. The figures illustrates a simplified example of an apparatus or network element applying embodiments of the invention. In some embodiments, the apparatus may be a network element or a part of a network element. In some embodiments, the apparatus may comprise several network entities connected to each other. In an embodiment, the apparatus is a gNB 408.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 408 of the example includes a control circuitry 900 configured to control at least part of the operation of the apparatus.

The apparatus may comprise a memory 902 for storing data. Furthermore, the memory may store software 904 executable by the control circuitry 900. The memory may be integrated in the control circuitry.

The apparatus further comprises one or more interface circuitries 906, 908 configured to connect the apparatus to other devices and network elements of the radio access network. An interface 906 may provide a wired or wireless connection. An interface 908 may provide a wireless connection to terminal devices served by the apparatus.

In an embodiment, the software 904 may comprise a computer program comprising program code means adapted to cause the control circuitry 900 of the apparatus to realise at least some of the embodiments described above.

In an embodiment, as shown in FIG. 9B, at least some of the functionalities of the apparatus of FIG. 9B may be shared between two physically separate devices, forming one operational entity. Therefore, the apparatus may be seen to depict the operational entity comprising one or more physically separate devices for executing at least some of the described processes. Thus, the apparatus of FIG. 9B, utilizing such shared architecture, may comprise a remote control unit RCU 920, such as a host computer or a server computer, operatively coupled (e.g. via a wireless or wired network) to a remote distributed unit RDU 922 located in the base station. In an embodiment, at least some of the described processes may be performed by the RCU 920. In an embodiment, the execution of at least some of the described processes may be shared among the RDU 922 and the RCU 920.

In an embodiment, the RCU 920 may generate a virtual network through which the RCU 920 communicates with the RDU 922. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits, ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

An embodiment provides an apparatus comprising means for receiving from network instructions of how to control multi-user multiple input multiple output connections maintained by one or more radio access nodes, the connections utilising one or more slices and means for controlling one or more radio access nodes to perform, based at least in part on the received network instructions, multi-user pairing of terminal devices of the same or different slices, and determine, based at least in part on the received network instructions, slice-based quota taking multi-user pairing and interference arising from paired allocations into account.

An embodiment provides an apparatus comprising means for receiving, from a network apparatus, instructions of how to control multi-user multiple input multiple output connections maintained by the apparatus the connections utilising one or more slices; means for determining, based on the received instructions, a first adjustment factor indicating how to perform multi-user pairing for terminal devices from a same of different slice; means for determining, based on the first adjustment factor and a slice prioritization weight, multi-user pairing and resource allocation for terminal devices; means for determining, based on the received instructions, a second adjustment factor to resources counted as consumed by a slice, the factor indicating how to take interference between terminal devices into account; means for determining, based on the received instructions and the second adjustment factor, a third adjustment factor indicating how to count resources towards slice quota; means for determining the number of resources consumed by a slice based on the number of allocated resources and second and third adjustment factors; means for determining, based on the determined number of resources, slice prioritization weight to be used in subsequent pairing and resource determination; and means for determining and transmitting a report to network regarding pairing, resources and interference.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a radio access network, the apparatus comprising:
    at least one processor; and
    at least one memory including computer program code, wherein the at least one memory and the computer program code are configured to, with the at least one processor, cause the apparatus at least to:
    receive from network instructions of how to control multi-user multiple input multiple output connections maintained by one or more radio access nodes, the connections utilizing one or more slices;
    control one or more radio access nodes to:
        perform, based at least in part on the received network instructions, multi-user pairing of terminal devices of the same or different slices, and
        determine, based at least in part on the received network instructions, slice-based quota taking multi-user pairing and interference arising from paired allocations into account;
    determine and indicate, based on the received network instructions, to one or more radio access nodes a relative preference for preferring or avoiding multi-user multiple input multiple output pairing users of a given slice with users of the same slice, or users of a different slice;
    determine and indicate, based on the received network instructions, to one or more radio access nodes a relative preference on how to perform counting of resources consumed by a slice compared to its slice quota when resources have been allocated in multi-user multiple input multiple output pairing fashion to multiple users of one or more slices in a slot;
    determine and indicate, based on the received network instructions, to one or more radio access nodes a relative preference on how to adjust the resources consumed by various slices taking into account the effect of interference between users belonging to the same slice or different slices that have been given multi-user multiple input multiple output paired allocations;
    determine that a given number N terminal devices of a slice are allocated the same set P of resource blocks in a given slot; and
    indicate the relative preference of how multi-user multiple input multiple output pairing are to be taken into account in determining slice-based quota with a first, second or third numerical value, wherein:
        the first value indicates that each of the terminal devices should be treated as having consumed all of the resources,
        the second value indicates that the slice is treated as having consumed only P resource blocks, regardless of the number of terminal devices N, and
        the third value indicates that if the number of terminal devices N is greater than or equal to two, the slice is treated as having consumed 2*P resource blocks, otherwise, the slice is treated as having consumed P resource blocks.

2. The apparatus of claim 1, wherein the at least one memory and the computer program code are configured to, with the at least one processor, cause the apparatus further to:
    indicate the relative preference of multi-user pairing terminal devices of a given slice with terminal devices of the same slice or terminal device of different slices with a numerical value between
    a first value indicating that a radio access node should avoid Mu-pairing users of the same slice and
    a second value indicating that a radio access node should only pair users of the same slice.

3. The apparatus of claim 1, wherein the at least one memory and the computer program code are configured to, with the at least one processor, cause the apparatus further to:
    determine that P resource blocks have been allocated,
    indicate the relative preference of whether interference arising from multi-user multiple input multiple output paired allocations are taken into account in determining slice-based quota with a first, second or third numerical value, where
    first value indicates that effect of interference between terminal devices is ignored, and any individual terminal device is treated as having consumed all allocated P resource blocks;
    second value indicates that if a given terminal device gets a paired allocation on a certain number of resources, then the terminal device is treated as having consumed a reduced number of resources based on the reduction in spectral efficiency that the terminal device would experience due to interference;
    third value indicates that the rule of first value is applied if all users are of the same slice, whereas the rule of second value is applied if the users are of different slices.

4. The apparatus of claim 1, wherein the at least one memory and the computer program code are configured to, with the at least one processor, cause the apparatus further to:

receive from one or more radio access nodes report regarding multi user pairing of terminal devices with terminal devices of the same or different slice, interference between terminal devices of the same or different slice, slice quota adjustment and resources.

5. The apparatus of claim 4, the at least one memory and the computer program code configured to, with the at least one processor, cause the apparatus further to:
adjust one or more relative preferences based on the received report.

6. A method, comprising:
receiving from network instructions of how to control multi-user multiple input multiple output connections maintained by one or more radio access nodes, the connections utilizing one or more slices;
controlling one or more radio access nodes to:
perform, based at least in part on the received network instructions, multi-user pairing of terminal devices of the same or different slices, and
determine, based at least in part on the received network instructions, slice-based quota taking multi-user pairing and interference arising from paired allocations into account;
determining and indicating, based on the received network instructions, to one or more radio access nodes a relative preference for preferring or avoiding multi-user multiple input multiple output pairing users of a given slice with users of the same slice, or users of a different slice;
determining and indicating, based on the received network instructions, to one or more radio access nodes a relative preference on how to perform counting of resources consumed by a slice compared to its slice quota when resources have been allocated in multi-user multiple input multiple output pairing fashion to multiple users of one or more slices in a slot;
determining and indicating, based on the received network instructions, to one or more radio access nodes a relative preference on how to adjust the resources consumed by various slices taking into account the effect of interference between users belonging to the same slice or different slices that have been given multi-user multiple input multiple output paired allocations;
determining that a given number N terminal devices of a slice are allocated the same set P of resource blocks in a given slot; and
indicating the relative preference of how multi-user multiple input multiple output pairing are to be taken into account in determining slice-based quota with a first, second or third numerical value, wherein:
the first value indicates that each of the terminal devices should be treated as having consumed all of the resources,
the second value indicates that the slice is treated as having consumed only P resource blocks, regardless of the number of terminal devices N, and
the third value indicates that if the number of terminal devices N is greater or equal to two, the slice is treated as having consumed 2*P resource blocks, otherwise, the slice is treated as having consumed P resource blocks.

7. The method of claim 6, further comprising:
indicating the relative preference of multi-user pairing terminal devices of a given slice with terminal devices of the same slice or terminal device of different slices with a numerical value between
a first value indicating that a radio access node should avoid Mu-pairing users of the same slice and
a second value indicating that a radio access node should only pair users of the same slice.

8. The method of claim 6, further comprising:
determining that P resource blocks have been allocated,
indicating the relative preference of whether interference arising from multi-user multiple input multiple output paired allocations are taken into account in determining slice-based quota with a first, second or third numerical value, where
first value indicates that effect of interference between terminal devices is ignored, and any individual terminal device is treated as having consumed all allocated P resource blocks;
second value indicates that if a given terminal device gets a paired allocation on a certain number of resources, then the terminal device is treated as having consumed a reduced number of resources based on the reduction in spectral efficiency that the terminal device would experience due to interference;
third value indicates that the rule of first value is applied if all users are of the same slice, whereas the rule of second value is applied if the users are of different slices.

9. A computer program embodied on an non-transitory computer-readable medium, the computer program comprising instructions for causing an apparatus to perform at least:
receiving from network instructions of how to control multi-user multiple input multiple output connections maintained by one or more radio access nodes, the connections utilizing one or more slices;
controlling one or more radio access nodes to:
perform, based at least in part on the received network instructions, multi-user pairing of terminal devices of the same or different slices, and
determine, based at least in part on the received network instructions, slice-based quota taking multi-user pairing and interference arising from paired allocations into account;
determining and indicating, based on the received network instructions, to one or more radio access nodes a relative preference for preferring or avoiding multi-user multiple input multiple output pairing users of a given slice with users of the same slice, or users of a different slice;
determining and indicating, based on the received network instructions, to one or more radio access nodes a relative preference on how to perform counting of resources consumed by a slice compared to its slice quota when resources have been allocated in multi-user multiple input multiple output pairing fashion to multiple users of one or more slices in a slot;
determining and indicating, based on the received network instructions, to one or more radio access nodes a relative preference on how to adjust the resources consumed by various slices taking into account the effect of interference between users belonging to the same slice or different slices that have been given multi-user multiple input multiple output paired allocations;
determining that a given number N terminal devices of a slice are allocated the same set P of resource blocks in a given slot; and
indicating the relative preference of how multi-user multiple input multiple output pairing are to be taken into account in determining slice-based quota with a first, second or third numerical value, wherein:

the first value indicates that each of the terminal devices should be treated as having consumed all of the resources, the second value indicates that the slice is treated as having consumed only P resource blocks, regardless of the number of terminal devices N, and the third value indicates that if the number of terminal devices N is greater than or equal to two, the slice is treated as having consumed 2*P resource blocks, otherwise, the slice is treated as having consumed P resource blocks.

* * * * *